United States Patent
Boutros et al.

(10) Patent No.: US 10,944,585 B1
(45) Date of Patent: Mar. 9, 2021

(54) MIGRATION FOR NETWORK APPLIANCES

(71) Applicant: VMware, Inc., Palo Alto, CA (US)

(72) Inventors: Sami Boutros, Union City, CA (US);
Mani Kancherla, Cupertino, CA (US);
Jayant Jain, Cupertino, CA (US);
Ankur Dubey, Palo Alto, CA (US);
Rajeev Nair, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/570,344

(22) Filed: Sep. 13, 2019

(51) Int. Cl.
*H04L 12/28* (2006.01)
*H04L 12/721* (2013.01)
*H04L 12/851* (2013.01)
*H04L 12/741* (2013.01)
*H04L 29/12* (2006.01)

(52) U.S. Cl.
CPC .......... *H04L 12/2816* (2013.01); *H04L 45/38* (2013.01); *H04L 45/745* (2013.01); *H04L 47/2483* (2013.01); *H04L 61/2567* (2013.01); *H04L 2012/285* (2013.01)

(58) Field of Classification Search
CPC ............. H04L 12/2816; H04L 47/2483; H04L 45/745; H04L 61/2567; H04L 45/38; H04L 2012/285
See application file for complete search history.

(56) References Cited

U.S. PATENT DOCUMENTS

| | | | |
|---|---|---|---|
| 2013/0124707 A1* | 5/2013 | Ananthapadmanabha | ................. H04L 47/2483 709/223 |
| 2014/0334489 A1* | 11/2014 | Bosshart | ................. H04L 47/56 370/392 |
| 2017/0091258 A1* | 3/2017 | Rajahalme | ............ H04L 45/021 |
| 2018/0097723 A1* | 4/2018 | Chinthalapati | ......... H04L 45/38 |
| 2018/0262599 A1* | 9/2018 | Firestone | ............ G06F 9/45558 |

* cited by examiner

*Primary Examiner* — Walter J DiVito
(74) *Attorney, Agent, or Firm* — Patterson & Sheridan, LLP

(57) ABSTRACT

Embodiments described herein involve appliance migration. Embodiments include connecting, by a second appliance that is configured to perform a service, to a first uplink and a first downlink of a first appliance that is configured to perform the service. Embodiments include connecting, by the second appliance, to a first endpoint and a second endpoint to which the first appliance is connected. Embodiments include determining, by the second appliance, existing flows processed by the first appliance. Embodiments include processing, by the second appliance, a plurality of packets received via the first endpoint by: forwarding, by the second appliance, first packets of the plurality of packets that correspond to the existing flows to the first appliance; and performing, by the second appliance, the service for second packets of the plurality of packets that do not correspond to the existing flows.

20 Claims, 4 Drawing Sheets

MIGRATION FOR NETWORK APPLIANCES

BACKGROUND

Software defined networking (SDN) comprises a plurality of hosts in communication over a physical network infrastructure, each host having one or more virtualized endpoints such as virtual machines (VMs) or containers that are connected to logical overlay networks that may span multiple hosts and are decoupled from the underlying physical network infrastructure. One common characteristic of software defined networking is a separation of the control plane from the data plane. Control planes in a network are concerned with determining the logical overlay network topology and maintaining information about network entities such as logical switches, logical routers, and virtualized endpoints, etc. The logical topology information is translated by the control plane into network configuration data, such as forwarding table entries to populate forwarding tables at virtual switches at each host. A virtual switch provided by a host may be thought of as a physical network switch implemented in software by the hypervisor, and may connect virtualized endpoints running on the same host to each other as well as to virtual endpoints on other hosts. A plurality of virtual switches distributed across a plurality of hosts may collectively, by way of their forwarding tables and with adjunct processes called tunnel endpoints (TEPs) implement a logical switch that can define a logical overlay network.

Communication between endpoints in a logical overlay network and external endpoints in a physical network infrastructure may involve network address translation (NAT), such as source network address translation (SNAT) and destination network address translation (DNAT). SNAT is a technique of translating source IP addresses and/or source ports in packet headers to other IP addresses and/or ports. For example, a router's or gateway's firewall may convert IP addresses contained in packets sent from devices in a private overlay network to public IP addresses when those packets pass through the firewall to an external network. Similarly, DNAT involves translating destination IP addresses and/or destination ports in packet headers of packets sent to devices in the overlay network from an external network from public IP addresses to the private IP addresses of the devices within the overlay network.

Replacing an appliance, such as a router, gateway, or firewall, that performs NAT functions can be challenging. For example, migrating to a new version of an appliance while traffic is flowing through the appliance may be difficult without interrupting NAT functions.

SUMMARY

Herein described are one or more embodiments of a method for appliance migration. The method generally includes: connecting, by a second appliance that is configured to perform a service, to a first uplink and a first downlink of a first appliance that is configured to perform the service; connecting, by the second appliance, to a first endpoint and a second endpoint to which the first appliance is connected; determining, by the second appliance, existing flows processed by the first appliance; and processing, by the second appliance, a plurality of packets received via the first endpoint by: forwarding, by the second appliance, first packets of the plurality of packets that correspond to the existing flows to the first appliance; and performing, by the second appliance, the service for second packets of the plurality of packets that do not correspond to the existing flows.

Also described herein are embodiments of a computer system, wherein software for the computer system is programmed to execute the method described above for appliance migration.

Also described herein are embodiments of a non-transitory computer readable medium comprising instructions to be executed in a computer system, wherein the instructions when executed in the computer system perform the method described above for appliance migration.

DETAILED DESCRIPTION

Figure 1:
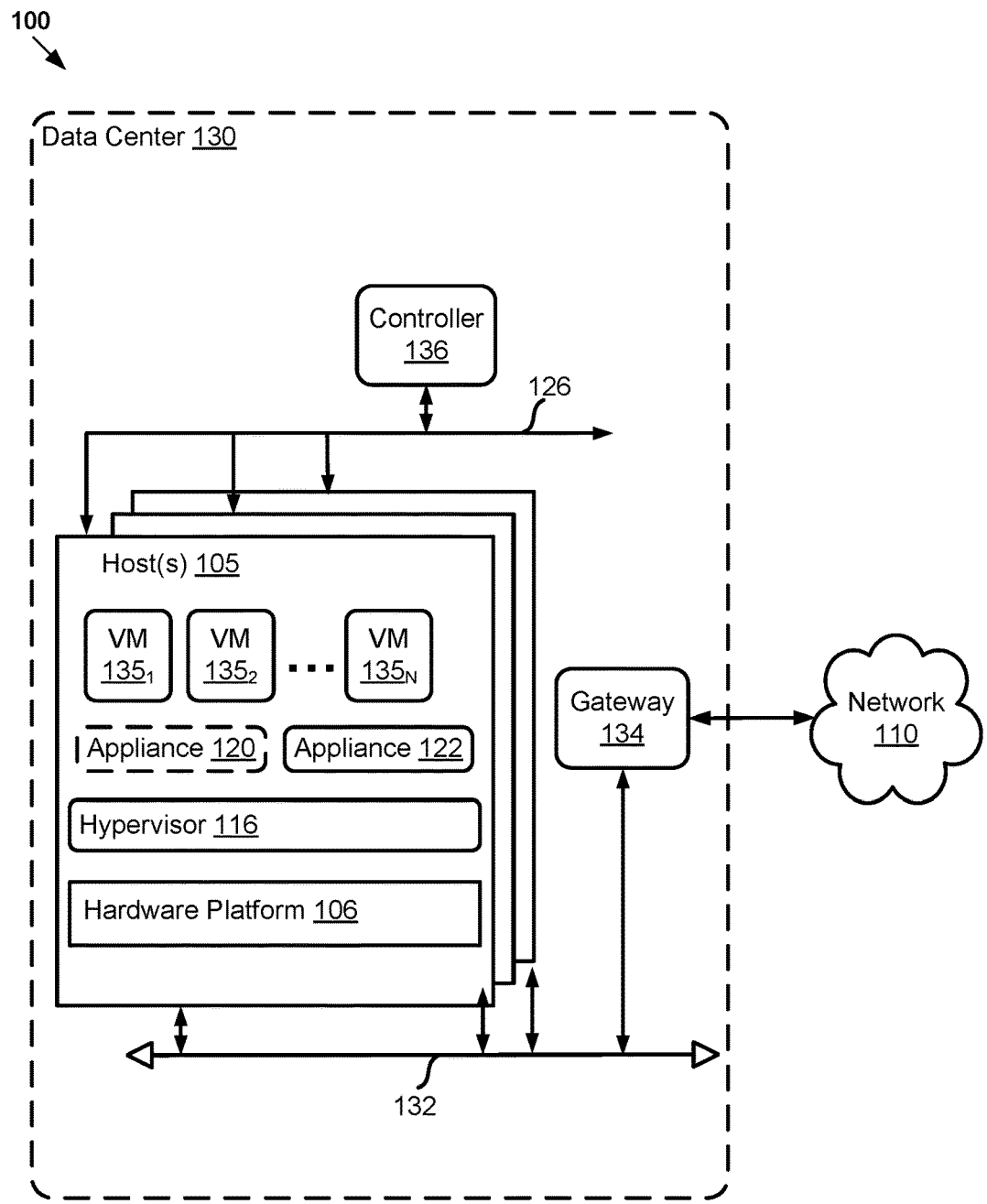
FIG. 1 illustrates a networking environment within which embodiments of the present disclosure may be implemented.

Replacing an appliance, such as a router, gateway, or firewall, in a logical overlay network presents a number of challenges, particularly when the appliance performs network address translation (NAT) functions. Simply removing the old appliance and replacing it with the new appliance may result in data loss, as there may be a gap between when the old appliance is removed and when the new appliance is activated. A new appliance is not conventionally able to take over a flow (e.g., a sequence of packets from a source to a destination) that is already being processed by an old appliance. When migrating from an old appliance to a new appliance, the new appliance may not be able to correlate packet flows before and after they have been modified by the old appliance, as the source or destination IP addresses and ports may have been modified by the NAT process. Correlating packet flows generally refers to identifying that two packet flows are related or belong to the same flow. The new appliance may also not be aware of which ports are being used by the old appliance, but may share the same NAT IP address (e.g., public IP address) as the old appliance.

Accordingly, techniques described herein involve leaving a first appliance running for a time period while transitioning to a second appliance that is meant to replace the first appliance. In certain embodiments, the second appliance (e.g., which is configured to perform the same service or services as the first appliance, such as NAT functions) is connected to the uplink and downlink of the old appliance and is also connected to endpoints to which the first appliance was connected, such as a virtual machine and a gateway in the logical overlay network. In some cases, the connections are established by modifying routing tables in the network, such as by a control plane. Accordingly, all packets that would have been transmitted to the first appliance from the gateway are received by the second appliance and all packets that would be have been sent by the virtual machine to the first appliance are received by the second appliance. Connected in this way between the first appliance, the virtual machine, and the gateway, the second appliance monitors incoming and outgoing packet flows for a monitoring period while forwarding packets received from the gateway and the virtual machine to the first appliance and forwarding packets received from the first appliance to the virtual machine or gateway as appropriate. A gateway is only included as one example of a source of inbound traffic to an overlay network, and other sources of inbound traffic are possible. In some embodiments, one or more tunnels may be included between the gateway and the appliances, such as if the appliances are implemented as virtual machines or other virtual computing instances.

In certain embodiments, the second appliance generates one or more flow tables (e.g., including, for example, IP addresses and/or port addresses of packets of flows, as further discussed below) based on its monitoring of incoming and outgoing packets. In one example, the second appliance generates a first flow table for existing incoming flows in which it stores information related to all flows it receives from the gateway during the monitoring period. In some embodiments, the second appliance also generates a second flow table for existing outgoing flows in which it stores information related to all flows it receives from the virtual machine during the monitoring period. As such, the second appliance learns about all existing flows processed by the first appliance during the monitoring period.

After the monitoring period, the second appliance begins processing new flows that had not yet begun during the monitoring period, while forwarding all existing flows (e.g., identified based on the flow table generated during the monitoring period) to the first appliance for processing and forwarding all packets received from the first appliance to the virtual machine or gateway as appropriate. In an example, the second appliance compares each packet received from the gateway to the incoming flow table to determine whether it belongs to an existing flow (e.g., by looking at IP addresses and/or port addresses in the header of each packet) and, if it does, sends the packet to the first gateway. Otherwise, if the packet does not correspond to an existing flow identified in the incoming flow table, the second appliance processes the packet by performing any relevant services, such as SNAT, DNAT, load balancing, or firewall services on the packet. In some embodiments, the second appliance uses the outgoing flow table to determine which ports are being used by the first appliance, and uses different ports than those identified in order to avoid overlap.

In some embodiments, the first appliance is decommissioned after all of the existing flows (e.g., all of the flows identified in the incoming and outgoing flow tables) have completed (e.g., if no packets are received for a given flow for a threshold period of time then the given flow may be identified as completed), and the ports used by the first appliance are freed for use by the second appliance or by other entities in the network. Subsequently, the second appliance processes all packets received from the gateway and the virtual machine. As such, techniques described herein allow for migration from the first appliance to the second appliance without interruption in service.

FIG. 1 illustrates a networking environment 100 within which embodiments of the present disclosure may be implemented. FIG. 1 is described in conjunction with FIG. 2, which depicts an example of NAT.

Networking environment 100 includes a data center 130 connected to network 110. Network 110 is generally representative of a network of computing entities such as a local area network ("LAN") or a wide area network ("WAN"), a network of networks, such as the Internet, or any connection over which data may be transmitted.

Data center 130 generally represents a set of networked computing entities, and may comprise a logical overlay network. Data center 130 includes host(s) 105, a gateway 134, a data network 132, which may be a Layer 3 network, and a management network 126. Data network 132 and management network 126 may be separate physical networks or different virtual local area networks (VLANs) on the same physical network.

Each of hosts 105 may be constructed on a server grade hardware platform 106, such as an x86 architecture platform. For example, hosts 105 may be geographically co-located servers on the same rack or on different racks. Host 105 is configured to provide a virtualization layer, also referred to as a hypervisor 116, that abstracts processor, memory, storage, and networking resources of hardware platform 106 into multiple virtual machines $135_1$ to $135_N$ (collectively referred to as VMs 135 and individually referred to as VM 135) that run concurrently on the same host. Hypervisor 116 may run in conjunction with an operating system (not shown) in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In some implementations, hypervisor 116 may comprise system level software as well as a "Domain 0" or "Root Partition" virtual machine (not shown) which is a privileged machine that has access to the physical hardware resources of the host. In this implementation, one or more of a virtual switch, virtual tunnel endpoint (VTEP), etc., along with hardware drivers, may reside in the privileged virtual machine. Although the disclosure is described with reference to VMs, the teachings herein also apply to other types of virtual computing instances (VCIs) or data compute nodes (DCNs), such as containers, which may be referred to as Docker containers, isolated user space instances, namespace containers, etc. In certain embodiments, VMs 135 may be replaced with containers that run on host 105 without the use of a hypervisor.

Host 105 includes a first appliance 120 and a second appliance 122 (e.g., each of which may be a distributed appliance that is maintained and controlled across multiple hosts 105 by controller 136) that perform one or more networking functions for packets arriving at host 105 and outgoing from host 105. In certain embodiments, appliances 120 and 122 are different instances of a virtual router, switch, firewall, or other type of appliance that performs NAT functions, load balancing, firewall functions, or the like. For instance, appliance 122 may be meant to replace appliance 120 according to techniques described herein. Settings of appliances 120 and 122, such as connections and translation rules, are determined by controller 136, as discussed further below. While appliances 120 and 122 are depicted independently of VMs 135, alternative embodiments include appliances 120 and 122 being implemented within one or more of VMs 135, or appliances 120 and 122 may be VMs. Alternatively or additionally to NAT functions, appliances 120 and 122 may perform other functions such as load balancing and/or firewall functions.

Gateway 134 provides VMs 135, appliances 120 and 122, and other components in data center 130 with connectivity to network 110 used to communicate with destinations (not shown) external to data center 130. Gateway 134 may be a virtual computing instance, a physical device, or a software module running within host 105. Gateway 134 may manage external public IP addresses for VMs 135 and route traffic incoming to and outgoing from data center 130 and provide networking services, such as firewalls, NAT, dynamic host configuration protocol (DHCP), and load balancing, such as by sending packets to appliances 120 and 122. Gateway 134 may use data network 132 to transmit data network packets to hosts 105. In certain embodiments, a tunnel is included between gateway 134 and appliances 120 and/or 122. Gateway 135 is included as one example of a link to network 110, and other types of virtual or physical devices may alternatively be used to transmit packets between network 110 and appliances 120 and 122.

Controller 136 generally represents a control plane that manages configuration of appliances 120 and 122 within data center 130. Controller 136 may be a computer program that resides and executes in a central server in data center 130 or, alternatively, controller 136 may run as a virtual appliance (e.g., a VM) in one of hosts 105. Although shown as a single unit, it should be understood that controller 136 may be implemented as a distributed or clustered system. That is, controller 136 may include multiple servers or virtual computing instances that implement controller functions. Controller 136 is associated with one or more virtual and/or physical CPUs (not shown). Processor(s) resources allotted or assigned to controller 136 may be unique to controller 136, or may be shared with other components of data center 130. Controller 136 communicates with hosts 105 via management network 126.

In certain embodiments, controller 136 configures appliances 120 and 122 by defining NAT rules and configuring routing tables, such as based on logical network configuration information received from a management plane (not shown). In certain embodiments, appliance 120 is an existing appliance that is to be replaced by appliance 122, which may be a newer or alternate version of appliance 120. In an example, appliance 120 is connected via appliance 122 to gateway 134 so that incoming packets received by gateway 134 are routed to appliance 120 via appliance 122, and outgoing packets from appliance 120 are routed via appliance 122 to gateway 134. Appliance 120 is also connected to VMs 135 via appliance 122 so that packets may be routed between VMs 135 and appliance 120.

Figure 2:
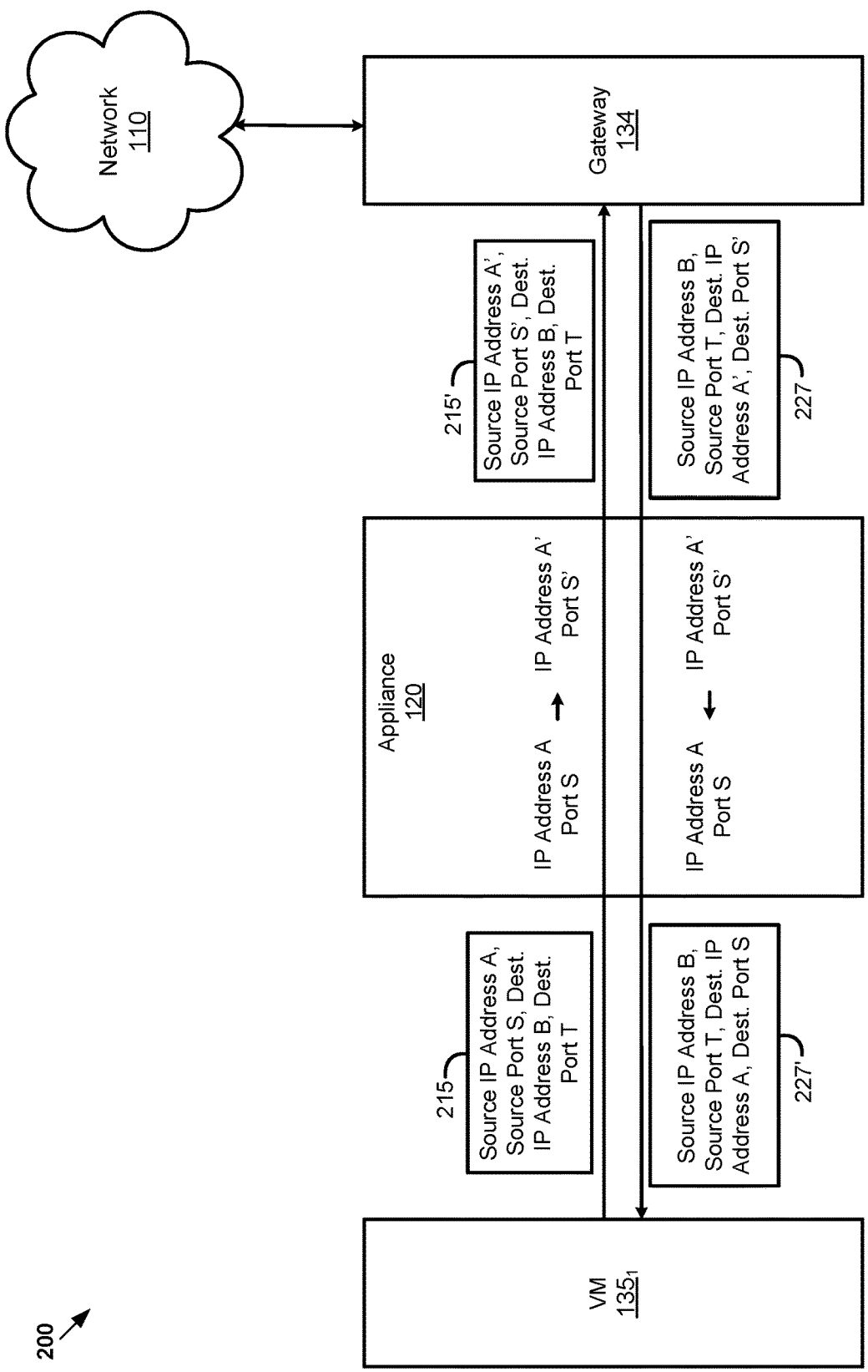
FIG. 2 illustrates an example of network address translation by an appliance.

As shown in example 200 of FIG. 2, appliance 120 may perform SNAT for outgoing packets directed to gateway 134 from a VM $135_1$ (representative of any of VMs 135) and DNAT for incoming packets received from gateway 134 and directed to VM $135_1$.

Packet 215 includes a packet header identifying a source IP address A, a source port S, a destination IP address B, and a destination port T. IP address A and port S are the actual IP address and port associated with VM $135_1$ within data center 130, and may be private. Appliance 120 performs SNAT by translating IP address A and port S to IP address A' and port S', which represent a public IP address and port that are presented to the external network 110. SNAT results in packet 215', in which the source IP address and source port are translated to A' and S', which is sent to gateway 134. In some embodiments, routing tables are configured such that all packets with a public IP address as a destination and private IP address A as a source from VM $135_1$ are routed to appliance 120. In some embodiments, routing tables are configured such that packets with a public IP address as a destination and a public IP address as a source are routed to the gateway. Gateway 134 may transmit packet 215' to destination IP address B via destination port T over network 110.

Packet 227 includes a packet header identifying a source IP address B, a source port T, a destination IP address A', and a destination port S'. IP address A' and port S' are the public IP address and port associated with VM $135_1$. Appliance 120 performs DNAT by translating IP address A' and port S' to IP address A and port S, which represent the actual IP address and port of VM $135_1$ within data center 130. DNAT results in packet 227', in which the destination IP address and destination port are translated to A and S, which is sent to VM $135_1$ at IP address A via port S. In some embodiments, routing tables are configured such that packets with destination IP address A' are routed to appliance 120. Further, routing tables are configured such that packets with destination IP address A are routed to VM $135_1$.

Certain embodiments involve a migration from appliance 120 to appliance 122. Because packet 215' has a different header than packet 215 and packet 227' has a different header than packet 227, it may be difficult for a separate entity, such as appliance 122, to correlate these packets before and after NAT (e.g., it may be difficult to determine that the packets before and after NAT belong to the same flow, given that appliance 120 will perform NAT and change the port and the source address on the original packet). As such, controller 136 alters routing connectivity for data center 130 such that appliance 122 is connected to an uplink and downlink of appliance 120 and also connected to the endpoints to which appliance 120 was connected, such as VMs 135 and gateway 134. As such, traffic passes through appliance 122. In other words, controller 136 configures the routing such that all traffic is routed to appliance 122 rather than appliance 120. Appliance 122 thereby monitors all traffic between VMs 135, appliance 120, and gateway 134 for a monitoring period in order to identify all existing flows and all ports being used by appliance 120. After the monitoring period, appliance 122 begins to perform NAT for all new flows, using only ports that are not being used by appliance 120, while forwarding packets from existing flows to appliance 120 for processing. Once all existing flows have completed, controller 136 may decommission appliance 120 so that all packets are processed by appliance 122, thereby completing the migration. The migration process is described in more detail below with respect to FIG. 3.

Figure 3:
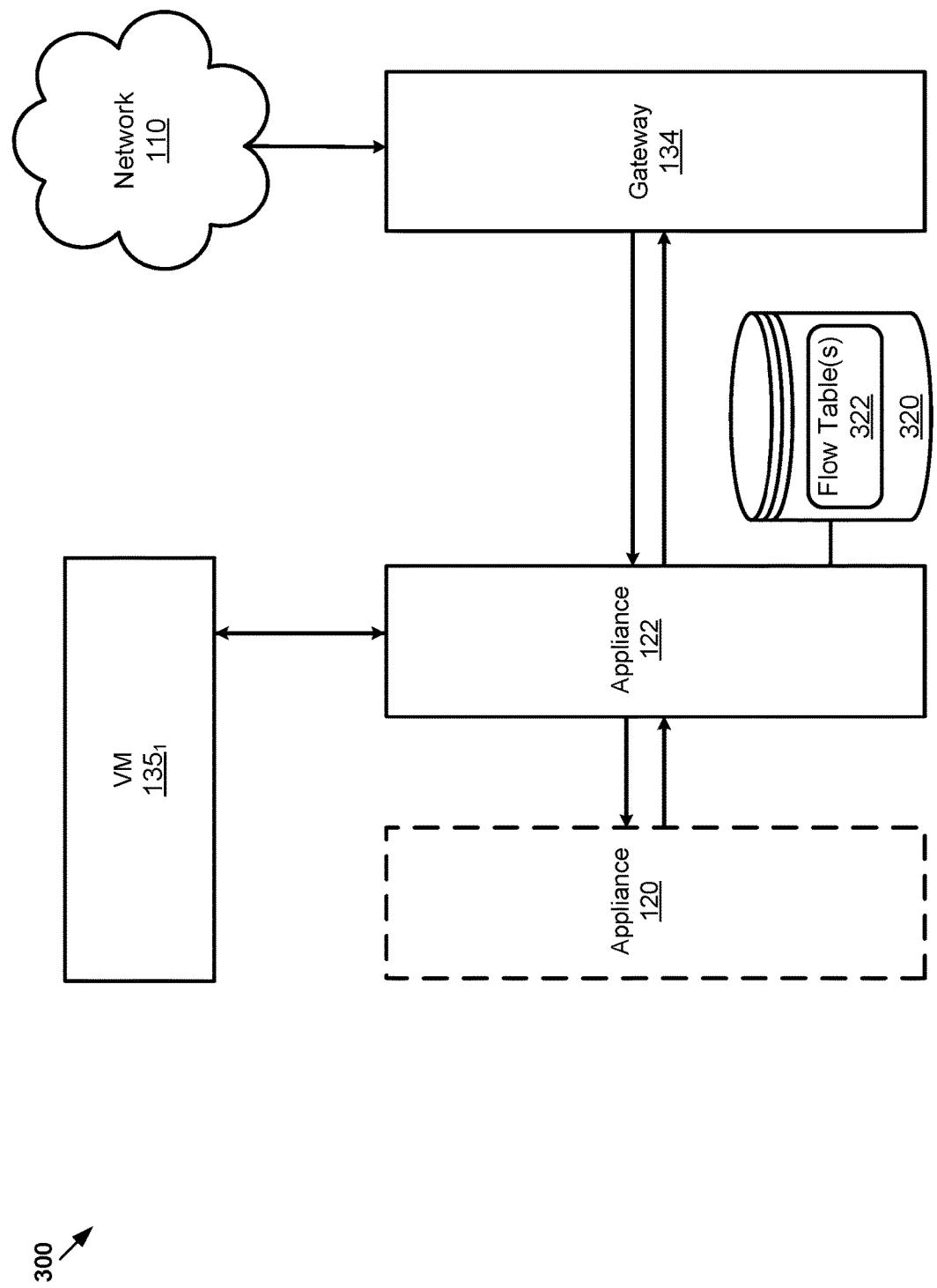
FIG. 3 illustrates an example of appliance migration according to techniques described herein.

FIG. 3 illustrates an example 300 of appliance migration according to techniques described herein.

Example 300 includes network 110, gateway 134, appliances 120 and 122, and VM $135_1$ of FIG. 1. In certain embodiments, appliance 122 is intended to replace appliance 120. Appliance 122 is connected to an uplink and downlink of appliance 120 and to the endpoints to which appliance 120 was previously connected (e.g., in example 200 of FIG. 2), including gateway 134 and VM $135_1$. Connected in this way between VM $135_1$, appliance 120, and gateway 134, appliance 122 monitors inbound flows and outbound flows to/from appliance 120 for a monitoring period, while forwarding all flows from VM $135_1$ and gateway 134 to appliance 120 for processing, and forwarding each flow received from appliance 120 to its intended destination (either VM $135_1$ or gateway 134). During the monitoring period, appliance 122 builds flow table(s) 322 in repository 320 based on all existing inbound flows and all existing outbound flows observed during the monitoring period. In one embodiment, flow table(s) 322 includes an inbound flow table and an outbound flow table, while in other embodiments the inbound and outbound flows are stored in a single flow table. In alternative embodiments, appliance 122 receives at least a subset of flow table(s) 322 from appliance 120, as appliance 120 may already have its own flow tables indicating all active inbound and outbound flows. Each of flow table(s) 322 generally comprises information about inbound and outbound flows, such as source and destination IP addresses and ports associated with flows, numbers of packets in flows, and the like. Repository 320 generally represents a data storage entity such as a database or repository backed by physical storage resources of hardware platform 106 of FIG. 1.

After the monitoring period has ended, appliance 122 begins processing new flows received from gateway 134 or VM 135₁ while forwarding existing flows that correspond to information in flow table(s) 322 from gateway 134 or VM 135₁ to appliance 120 for processing. For example, appliance 122 may identify existing flows and new flows by comparing flows received from gateway 134 and VM 135₁ to flow table(s) 322. In some embodiments, appliance 122 forwards packets to appliance 120 by setting an address of appliance 120 as a next hop for the packets.

In certain embodiments, appliance 122 performs NAT services for new flows, and forwards existing flows to appliance 120 for NAT services. For example, appliance 122 performs DNAT for inbound packets of new flows received from gateway 124 and destined for VM 135₁ and SNAT for outbound packets of new flows received from VM 135₁ and destined for gateway 134. VM 135₁ is included to be representative of any of VMs 135₁₋ₙ of FIG. 1.

In some embodiments, after all existing flows recorded in flow table(s) 322 have completed, such as when the last packets of all existing flows have been forwarded by appliance 122 to VM 135₁ or to gateway 134, (e.g., when no packets have been received for each existing flow for a threshold amount of time) then appliance 120 may be decommissioned. For example, appliance 120 may be disconnected or otherwise shut down. After appliance 120 has been decommissioned, appliance 122 processes all inbound and outbound flows.

It is noted that, while a single gateway 134 and VM 135₁ are depicted in FIGS. 2 and 3, multiple VMs and/or gateways may be connected to appliances 120 and/or 122.

Figure 4:
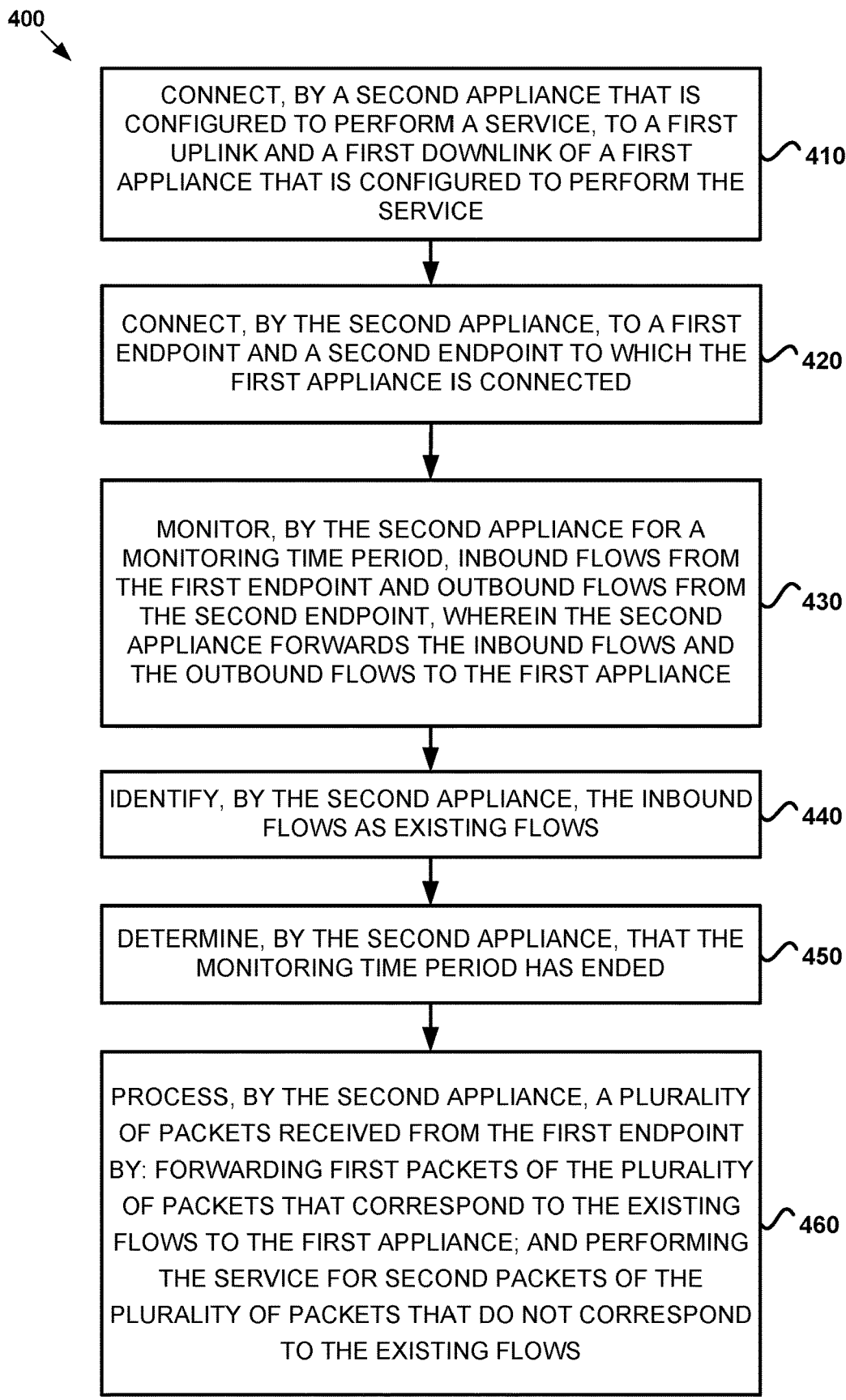
FIG. 4 illustrates example operations for appliance migration according to embodiments of the present disclosure.

FIG. 4 illustrates example operations 400 for appliance migration, according to embodiments of the present disclosure. In some embodiments, operations 400 are performed by appliance 122 of FIG. 1 as part of a migration process from appliance 120 of FIG. 1 to appliance 122 of FIG. 1.

Operations 400 begin at step 410, where a second appliance that is configured to perform a service connects to a first uplink and a first downlink of a first appliance that is configured to perform the service. In certain embodiments, appliance 122 of FIG. 1 connects to an uplink and a downlink of appliance 120 of FIG. 1. In certain embodiments, the connection is established based on routing tables configured by a control plane.

At step 420, the second appliance connects to a first endpoint and a second endpoint to which the first appliance is connected. In certain embodiments, appliance 122 of FIG. 1 connects to gateway 134 and VM 135₁ of FIG. 1, such as based on routing tables configured by the control plane.

At step 430, the second appliance monitors, for a monitoring period, inbound and outbound flows to/from the first endpoint and the second endpoint, wherein the second appliance forwards the inbound flows and the outbound flows to the first appliance. In certain embodiments, appliance 122 of FIG. 1 monitors all inbound/outbound flows to/from gateway 134 of FIG. 1 and all inbound/outbound flows to/from VM 135₁ of FIG. 1, while forwarding the inbound flows and outbound flows to appliance 120 for processing, and not performing NAT functions on any packets during the monitoring period. In some embodiments, appliance 122 of FIG. 1 receives inbound and outbound flows from appliance 120 of FIG. 1 (e.g., after appliance 120 processes the flows), and forwards them to their intended destination (e.g., VM 135₁ or gateway 134 of FIG. 1).

At step 440, the second appliance identifies the inbound flows (and, in some embodiments, the outbound flows) as existing flows. For instance, appliance 122 of FIG. 1 may store information about the inbound flows in an existing flow table of flow table(s) 322 of FIG. 3. In some embodiments, appliance 122 of FIG. 1 stores information about the outbound flows received from appliance 120 of FIG. 1 in an outbound flow table of flow table(s) 322 of FIG. 3.

At step 450, the second appliance determines that the monitoring time period has ended. The monitoring time period is generally set in advance, such as by an administrator.

At step 460, the second appliance processes a plurality of packets received from the first endpoint (and, in some embodiments, the second endpoint) by forwarding first packets of the plurality of packets that correspond to the existing flows to the first appliance and performing the service for second packets of the plurality of packets that do not correspond to the existing flows. In certain embodiments, appliance 122 of FIG. 1 compares each given packet of the plurality of packets to information of flow table(s) 322 of FIG. 3 to determine whether the given packet belongs to an existing flow identified at step 440. In an embodiment, for packets that do not belong to existing flows, appliance 122 of FIG. 1 performs NAT functions, using ports different than those used in the existing outbound flows from application 120 of FIG. 1 that were monitored during the monitoring period. As such, appliance 122 of FIG. 1 is able to perform NAT functions for all new flows while forwarding all existing flows to appliance 120 of FIG. 1 for NAT functions.

In certain embodiments, after all existing flows have completed, the first appliance is decommissioned, such as by disconnecting or otherwise shutting down the first appliance. At this point the second appliance performs the service for all flows.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for appliance migration, comprising:
   connecting, by a second appliance that is configured to perform a service, to a first uplink and a first downlink of a first appliance that is configured to perform the service;
   connecting, by the second appliance, to a first endpoint and a second endpoint to which the first appliance is connected;
   determining, by the second appliance, existing flows processed by the first appliance; and
   processing, by the second appliance, a plurality of packets received via the first endpoint by:
      forwarding, by the second appliance, first packets of the plurality of packets that correspond to the existing flows to the first appliance; and
      performing, by the second appliance, the service for second packets of the plurality of packets that do not correspond to the existing flows.

2. The method of claim 1, further comprising identifying, by the second appliance, ports contained in outbound flows from the first appliance as occupied ports, wherein the occupied ports are not used by the second appliance when performing the service.

3. The method of claim 1, further comprising generating at least one flow table based on the existing flows, wherein the at least one flow table includes information related to the existing flows.

4. The method of claim 3, wherein forwarding, by the second appliance, the first packets to the first appliance comprises:
   determining, based on at least a subset of the at least one flow table, that the first packets correspond to respective flows of the existing flows; and
   forwarding the first packets to the first appliance.

5. The method of claim 1, further comprising:
   determining that the existing flows have completed; and
   decommissioning the first appliance.

6. The method of claim 1, wherein performing, by the second appliance, the service for the second packets comprises performing network address translation (NAT).

7. The method of claim 1, wherein determining, by the second appliance, the existing flows of the first appliance comprises:

monitoring, by the second appliance for a monitoring time period, inbound flows and outbound flows to and from the first endpoint and the second endpoint; and identifying, by the second appliance, the inbound flows and the outbound flows as the existing flows.

8. A computer system comprising:
one or more processors; and
a non-transitory computer-readable medium storing instructions that, when executed by the one or more processors, cause the computer system to perform a method for appliance migration, the method comprising:
  connecting, by a second appliance that is configured to perform a service, to a first uplink and a first downlink of a first appliance that is configured to perform the service;
  connecting, by the second appliance, to a first endpoint and a second endpoint to which the first appliance is connected;
  determining, by the second appliance, existing flows processed by the first appliance; and
  processing, by the second appliance, a plurality of packets received via the first endpoint by:
    forwarding, by the second appliance, first packets of the plurality of packets that correspond to the existing flows to the first appliance; and
    performing, by the second appliance, the service for second packets of the plurality of packets that do not correspond to the existing flows.

9. The computer system of claim 8, wherein the method further comprises identifying, by the second appliance, ports contained in outbound flows from the first appliance as occupied ports, wherein the occupied ports are not used by the second appliance when performing the service.

10. The computer system of claim 8, wherein the method further comprises generating at least one flow table based on the existing flows, wherein the at least one flow table includes information related to the existing flows.

11. The computer system of claim 10, wherein forwarding, by the second appliance, the first packets to the first appliance comprises:
  determining, based on at least a subset of the at least one flow table, that the first packets correspond to respective flows of the existing flows; and
  forwarding the first packets to the first appliance.

12. The computer system of claim 8, wherein the method further comprises:
  determining that the existing flows have completed; and
  decommissioning the first appliance.

13. The computer system of claim 8, wherein performing, by the second appliance, the service for the second packets comprises performing network address translation (NAT).

14. The computer system of claim 8, wherein determining, by the second appliance, the existing flows of the first appliance comprises:

monitoring, by the second appliance for a monitoring time period, inbound flows and outbound flows to and from the first endpoint and the second endpoint; and identifying, by the second appliance, the inbound flows and the outbound flows as the existing flows.

15. A non-transitory computer readable medium comprising instructions that, when executed by one or more processors of a computing system, cause the computing system to perform a method for appliance migration, the method comprising:
  connecting, by a second appliance that is configured to perform a service, to a first uplink and a first downlink of a first appliance that is configured to perform the service;
  connecting, by the second appliance, to a first endpoint and a second endpoint to which the first appliance is connected;
  determining, by the second appliance, existing flows processed by the first appliance; and
  processing, by the second appliance, a plurality of packets received via the first endpoint by:
    forwarding, by the second appliance, first packets of the plurality of packets that correspond to the existing flows to the first appliance; and
    performing, by the second appliance, the service for second packets of the plurality of packets that do not correspond to the existing flows.

16. The non-transitory computer readable medium of claim 15, wherein the method further comprises identifying, by the second appliance, ports contained in outbound flows from the first appliance as occupied ports, wherein the occupied ports are not used by the second appliance when performing the service.

17. The non-transitory computer readable medium of claim 15, wherein the method further comprises generating at least one flow table based on the existing flows, wherein the at least one flow table includes information related to the existing flows.

18. The non-transitory computer readable medium of claim 17, wherein forwarding, by the second appliance, the first packets to the first appliance comprises:
  determining, based on at least a subset of the at least one flow table, that the first packets correspond to respective flows of the existing flows; and
  forwarding the first packets to the first appliance.

19. The non-transitory computer readable medium of claim 15, wherein the method further comprises:
  determining that the existing flows have completed; and
  decommissioning the first appliance.

20. The non-transitory computer readable medium of claim 15, wherein performing, by the second appliance, the service for the second packets comprises performing network address translation (NAT).

\* \* \* \* \*